Nov. 17, 1931.  E. WILHELM ET AL  1,832,599
TRACTOR SAW
Filed July 5, 1929  2 Sheets-Sheet 1

Elmer Wilhelm  Inventor
Geo. P. Lucas, Jr.

By  *Emil F. Lange*
Attorney

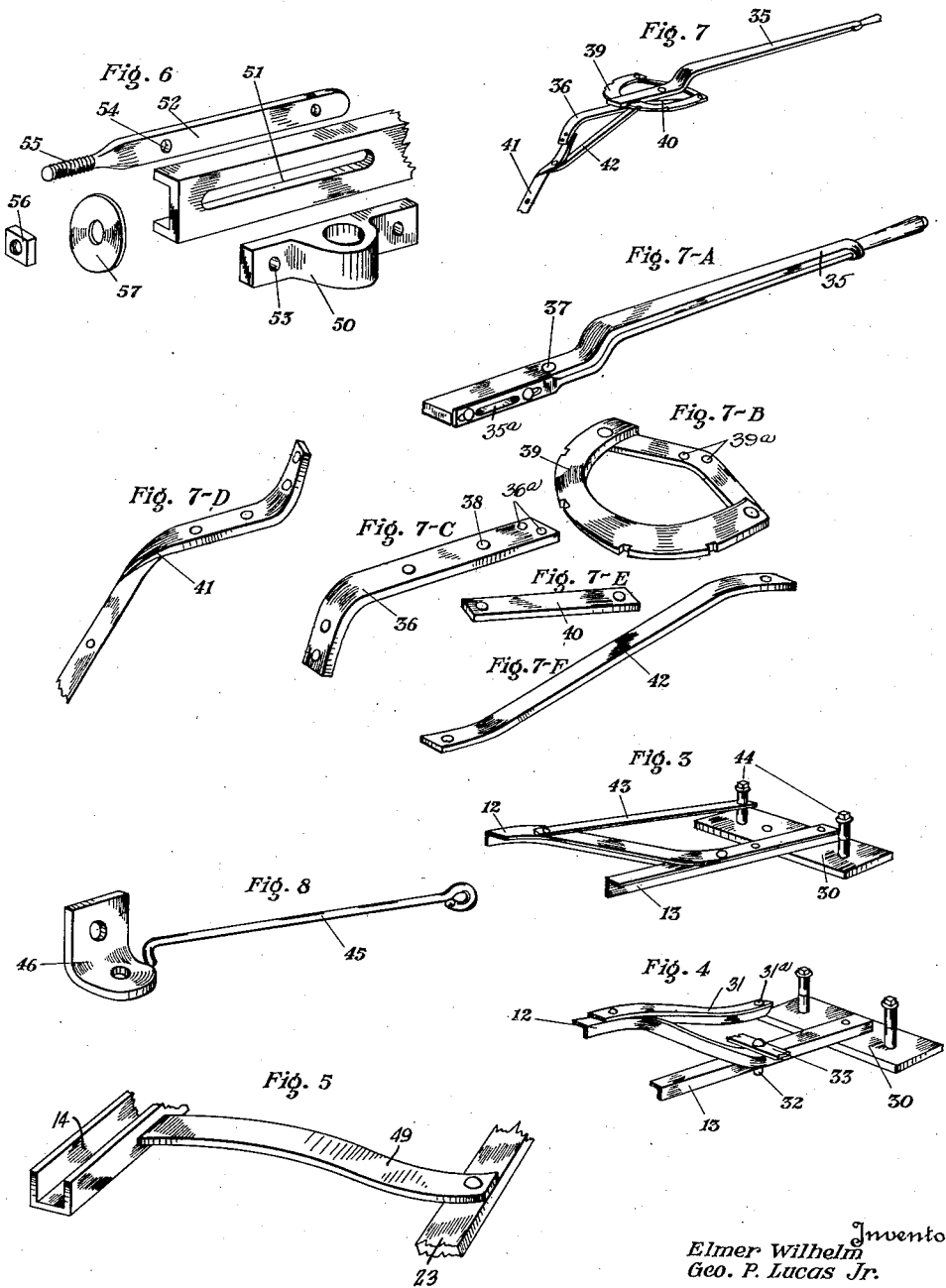

Patented Nov. 17, 1931

1,832,599

UNITED STATES PATENT OFFICE

ELMER WILHELM AND GEORGE P. LUCAS, JR., OF PALMYRA, NEBRASKA

TRACTOR SAW

Application filed July 5, 1929. Serial No. 375,979.

Our invention relates to tractor saws and its primary object is the provision of a saw attachment adapted to be driven by power from the tractor to fell trees and to saw the wood up into pieces of any desired length.

Another of our objects is the provision of a saw attachment which is especially useful on farms having wood lots.

Another of our objects is the provision of a convertible saw attachment whereby the attachment may be readily placed in position for felling trees and as easily placed in the position required for sawing logs.

Another object which we have in view is the provision of a lever control which is readily accessible from the seat on the tractor when the saw is to be used in felling trees, the lever being so formed and connected that it gives ample control over the saw and yet remains always accessible to the operator.

We have in view also the provision of a saw attachment which is exceedingly simple in operation and which can be manufactured and sold at a relatively low cost.

Having in view these objects and others which will be pointed out in the following description, we will now refer to the drawings, in which Figure 1 is a view in perspective of the saw attachment and a portion of the tractor, the attachment being in position for felling trees.

Figure 3 is a view in perspective of the connecting members in the Figure 2 position.

Figure 4 is a perspective view of the members for connecting the saw attachment to the tractor when the attachment is in the Figure 1 position.

Figure 5 is a view in perspective of the bumper shown in Figure 2.

Figure 6 is a perspective view showing the various members of the belt tighteners.

Figure 7 is a perspective view of the lever assembly.

Figure 7A is an illustration of the lever alone.

Figure 7B is an illustration of the arcuate rack for latching the lever.

Figures 7C and 7D are illustrations of the lever extensions.

Figures 7E and 7F are illustrations showing the two braces used in the lever assembly.

Figure 8 is a perspective view of the latch used when the attachment is in the Figure 2 position during transportation.

Figure 1:
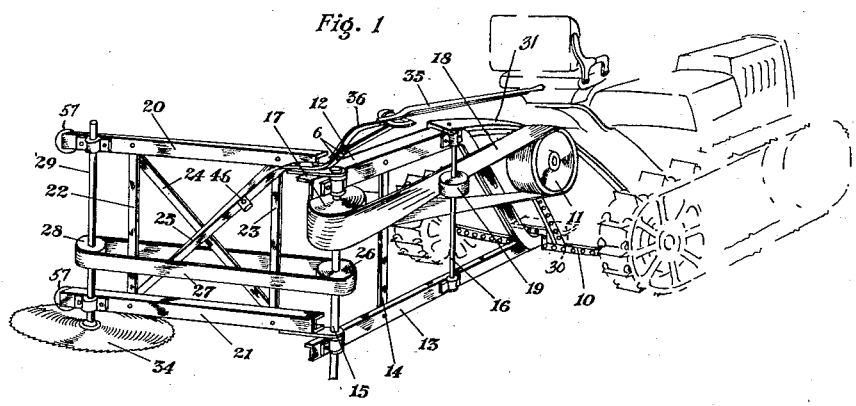

The tractor to which our attachment is to be applied is a tractor of the track laying or caterpillar type. This tractor is provided with a plurality of ribs 10 at its rear extremity and with a pulley wheel 11 to provide power.

The attachment consists of two parts, one of which is to be secured rigidly to the tractor. This is the supporting frame of the saw attachment and to this is pivotally secured the saw frame. The supporting frame includes two angle iron beams 12 and 13. The beams 12 and 13 are parallel in their rear portions but the beam 12 is inclined toward the beam 13 to which its end portion is rigidly secured at a point slightly in the rear of the extremity of the beam 13. The supporting frame is braced by means of a brace 14 connecting the parallel portions of the beams 12 and 13. The two shafts 15 and 16 also connect the parallel portions of the beams 12 and 13, the shaft 15 being the pulley shaft while the shaft 16 is the idler shaft. The pulley 17 is secured to the shaft 15 and is driven from the pulley 11 through the belt 18. The shaft 16 carries an idler pulley 19 for properly tensioning and guiding the belt 18. Other belt tighteners, however, are employed and these will be subsequently described. These other belt tighteners are associated with the bearings of the shaft 15.

The saw frame includes two channel iron beams 20 and 21 each having plate extensions with apertures for receiving the shaft 15. The saw frame is therefore pivotally mounted to swing on the supporting frame about the shaft 15 as a pivot. The saw frame has two transverse braces 22 and 23 connecting the beams 20 and 21 and it also has two diagonal braces 24 and 25 for giving rigidity to the saw frame. The shaft 15 carries a pulley 26 which is connected by means of a belt 27 with a pulley 28 on the saw shaft 29. The saw shaft 29 has bearings at the rear extremities of the beams 20 and 21 and these bearings are similar to the bearings of the shaft 15 and they are also provided with belt tighteners.

In the use of the saw for felling trees the frame is attached in the manner indicated in Figure 1, the manner of attaching being best shown in Figure 4. The plate 30 is secured to the under side of the tractor and the forward end of the beam is secured to the plate 30. An additional brace 31 is provided which is secured to the beam 12 and which is provided with an aperture 31a in its forward end portions for receiving a stud bolt for secure attachment to the tractor near the pulley 11. When the parts are in this position, the driver manipulates the tractor into close proximity to the tree which is to be felled. He can choose his position with reference to the tree and especially with reference to the direction in which the tree is to fall. He can regulate the height of the saw 34 by blocking up the tractor at either the front or rear ends of the caterpillar track. By blocking up the front end the driver will be enabled to cut close to the ground and if he wishes to cut at a higher level he may block up the rear end of the tracks accordingly. When the saw 34 is in contact with the tree it is only necessary for the operator to maintain a sufficient pressure of the saw against the tree. For this purpose we have provided a lever which gives ample range of operations without becoming inaccessible from the position of the driver of the tractor.

The lever 35 has its hand grip immediately in the rear of the seat of the tractor as is shown in Figure 1. The rear end of the lever is secured to the forward end of the plate extension 41 of the beam 20 and it is extended diagonally downward to connect with the beam 21 to provide an additional brace for the saw frame. The lever 35 and its parts are best shown in Figure 7 and the figures immediately following. The lever 35 is pivotally connected to a second lever 36 the pivotal connection being made through the apertures 37 and 38. The lever 36 is rigidly secured at its forward extremity to an arcuate rack 39, rivet apertures 36a and 39a for the purpose being provided in both the lever 36 and the rack 39. The diagonal brace 40 shown in Figure 7E connects the arcuate rack 39 to the lever 36 to make the connection more rigid. The lever extension 41 is securely connected with the lever 36 and it is provided with means for detachable connection with the beam 20. To provide additional rigidity the brace 42 shown in Figure 7F connects the lever 36 to the lever extension 41. The lever 35 is provided with a detent for engaging one of the peripheral notches in the arcuate rack 39. The purpose of this construction will be apparent from an inspection of Figure 1. When the driver has shifted his position into close proximity with the tree, he may find that the hand grip of the lever 35 is not in the most convenient position for maintaining a constant pressure of the saw against the tree. He may, however, shift the lever 35 with reference to the lever 36 and to latch the two levers in any desired angular relation by means of the detent 35a and the rack 39. If the tree is one of fairly large diameter a second or even third shifting of the lever 35 may be necessary since it is desirable at all times that the operator maintain a fairly uniform pressure of the saw in the tree without leaving his position on the tractor.

Figure 2:
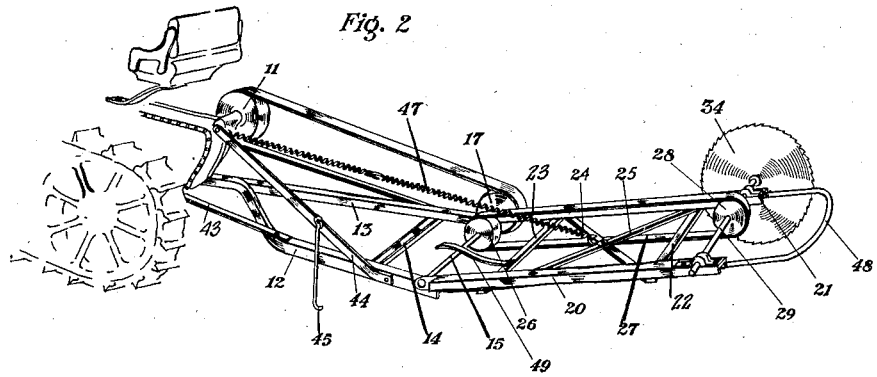
Figure 2 is a perspective view showing the same attachment in position for sawing logs.

When the attachment is to be used for cutting up logs the attachment is positioned as shown in Figure 2. In this case the connections are made as shown in Figure 3. The beams 12 and 13 are turned over on the side and secured to the plate 30. The brace 31 is replaced by the brace 43 which extends from the beam 12 to the fastening device 44. The fastening device 44 comprises a bolt having two collars as shown, the bolt passing through an aperture in the brace 43. The lever 35 and its assembly as well as the shaft 16 with the idler pulley 19 are removed. The belt pulley 17 is attached at the outer extremity of the shaft 15 and in alignment with the pulley 11. The frame is further braced by means of the brace 31 extending from the curved portion of the beam 12 to the tractor at a point 31a in close proximity to the shaft of the pulley 11. The brace 44 has secured thereto a latch 45 which is adapted to engage in the aperture of the lug 46 as shown in Figures 2 and 8. The lug 46 is permanently secured to the plate extension 41. The counterbalancing spring 47 is secured at its rear end to the saw frame at the junction of the braces 24 and 25 and it is secured at its forward end to the tractor. The purpose of this counterbalancing spring of course is to prevent the rear end of the saw frame from falling below a predetermined level. The frame in this position is further provided with a bail handle 48 whereby the operator may conveniently depress the saw against the wood to be sawed. In transporting the implement it is desirable that the saw frame be folded over the supporting frame and this may readily be done by lifting up on the bail handle 48. The saw frame is provided with the resilient bumper 49 which is adapted to engage in the channel of the beam 14 to prevent excessive forward movement of the saw frame. The bumper 49 is sufficiently heavy and it is resilient enough to cushion the saw frame on the supporting frame when traveling over rough roads.

The bearings at the ends of the shafts 15 and 29 are slidably adjustable so that the two belts may be tightened. The specific bearing and the means for adjusting the bearings is shown in Figure 6. The bearing member 50 is seated against the outer side of the beam which may be one of the angle beams 12 or 13 or one of the channel iron beams 20 or 21. The beam is provided with an elongated slot 51. The bar 52 is seated within the beam directly opposite the bearing member 50. The bearing member is provided with a pair of apertures 53 in alignment with corresponding apertures 54 in the bar 52. The bearing member and the bar may thus be secured together on opposite sides of the beam by means of bolts passing through the apertures 53 and 54. The end 55 of the bar 52 is screw threaded for receiving a nut 56 with a washer 57, the washer 57 being seated against the end of the beam. It will be readily apparent that the turning of the nut 56 on the screw threaded portion 55 will slide the bearing member 50 lengthwise of the beam and thus tighten or loosen the belt.

Having thus described our invention in such full, clear, and exact terms that its construction and operation will be readily understood by others skilled in the art to which it pertains, what we claim as new and desire to secure by Letters Patent of the United States is:

A tractor saw attachment including a pulley frame adapted to be turned through 90° and for attachment to a tractor to project rearwardly therefrom, comprising an angle iron for attachment to said tractor, a second angle iron parallel to said first angle iron and having an end portion inclined towards and secured to said first angle iron, detachable brace means adapted to be secured to the upper face of the second angle iron in each of its positions and also secured to the tractor in each position of the pulley frame, whereby the pulley frame may be attached to the tractor in either of two positions 90° apart, a shaft on said pulley frame, said shaft being driven by the tractor motor, a saw frame pivotally connected to said pulley frame, a saw on said saw frame, and means connecting said shaft and said saw for operating said saw.

In testimony whereof we affix our signatures.

ELMER WILHELM.
GEORGE P. LUCAS, Jr.